(12) United States Patent
Xue et al.

(10) Patent No.: US 10,412,812 B2
(45) Date of Patent: Sep. 10, 2019

(54) STREET LAMP CONTROLLER

(71) Applicants: Tyco Electronics (Shanghai) Co. Ltd., Shanghai (CN); TE Connectivity Australia Pty Ltd, Mascot (AU)

(72) Inventors: Song Xue, Shanghai (CN); Lizhang Yang, Shanghai (CN); Michael John Baker, Mascot (AU); Andrew Jay Thompson, Mascot (AU)

(73) Assignees: Tyco Electronics (Shanghai) Co. Ltd., Shanghai (CN); TE Connectivity Australia Pty Ltd, Mascot (AU)

( * ) Notice: Subject to any disclaimer, the term of this patent is extended or adjusted under 35 U.S.C. 154(b) by 0 days.

(21) Appl. No.: 16/005,107

(22) Filed: Jun. 11, 2018

(65) Prior Publication Data

US 2018/0295703 A1     Oct. 11, 2018

Related U.S. Application Data

(63) Continuation of application No. PCT/IB2016/057350, filed on Dec. 5, 2016.

(30) Foreign Application Priority Data

Dec. 9, 2015   (CN) .................... 2015 2 1016474 U

(51) Int. Cl.
*H05B 33/08*     (2006.01)
*H05B 37/02*     (2006.01)
(Continued)

(52) U.S. Cl.
CPC ..... *H05B 37/0218* (2013.01); *H05B 37/0227* (2013.01); *H05B 37/0272* (2013.01);
(Continued)

(58) Field of Classification Search
None
See application file for complete search history.

(56) References Cited

U.S. PATENT DOCUMENTS 9,113,529 B2 *    8/2015  Chen ................... H05B 33/089
2014/0252958 A1 * 9/2014  Subotnick .......... H05B 37/0218
                                                              315/149

FOREIGN PATENT DOCUMENTS

DE   10 2010 014974 A1   10/2011
KR      2013 0142612 A   12/2013

OTHER PUBLICATIONS

PCT Notification of Transmittal of the International Search Report and The Written Opinion of the International Searching Authority, dated Feb. 20, 2017, 11 pages.
(Continued)

*Primary Examiner* — Dedei K Hammond
(74) *Attorney, Agent, or Firm* — Barley Snyder

(57) ABSTRACT

A street lamp controller comprises a switch configured to turn on and turn off a street lamp, a control module adapted to control the turning on and turning off of the switch, a detection module adapted to detect a data element relevant to operation of the street lamp, a data acquisition module connected to the detection module and adapted to acquire the data element detected by the detection module, and a wireless transmission module. The wireless transmission module communicates with a server and is adapted to transmit the data element acquired by the data acquisition module to the server and receive a control instruction sent from the server. The control module is adapted to communicate with the server via the wireless transmission module and is adapted to control the street lamp based on the control instruction received by the wireless transmission module.

8 Claims, 3 Drawing Sheets

(51) Int. Cl.
*H05B 37/03* (2006.01)
*F21W 131/103* (2006.01)
(52) U.S. Cl.
CPC ....... *H05B 37/0281* (2013.01); *H05B 37/034* (2013.01); *F21W 2131/103* (2013.01); *Y02B 20/46* (2013.01); *Y02B 20/48* (2013.01)

(56) References Cited

OTHER PUBLICATIONS

Abstract of DE 10 2010 014974, dated Oct. 20, 2011, 1 page.
Abstract of KR20130142612, dated Dec. 30, 2013, 1 page.

* cited by examiner

STREET LAMP CONTROLLER

CROSS-REFERENCE TO RELATED APPLICATIONS

This application is a continuation of PCT International Application No. PCT/IB2016/057350, filed on Dec. 5, 2016, which claims priority under 35 U.S.C. § 119 to Chinese Patent Application No. 201521016474.1, filed on Dec. 9, 2015.

FIELD OF THE INVENTION

The present invention relates to a street lamp controller and, more particularly, to a street lamp controller capable of changing a working state of a street lamp according to actual application conditions.

BACKGROUND

A known street lamp controller comprises only one switch and a control module for controlling turning off and turning on of the switch. Generally, the control module automatically turns off and turns on the switch based on a preset control program. For example, every day at 6:00 PM, the control module turns on the switch and lights the street lamp, and every day at 6:00 AM, the control module turns off the switch and thus the light.

Known street lamp controllers are not capable of changing the working state of the street lamp according to changes in actual application conditions. For example, the illuminance of the present street lamp is constant and unable to change according to an ambient weather environment, which causes insufficient illuminance of the street lamp on rainy days, affecting traffic safety.

SUMMARY

A street lamp controller comprises a switch configured to turn on and turn off a street lamp, a control module adapted to control the turning on and turning off of the switch, a detection module adapted to detect a data element relevant to operation of the street lamp, a data acquisition module connected to the detection module and adapted to acquire the data element detected by the detection module, and a wireless transmission module. The wireless transmission module communicates with a server and is adapted to transmit the data element acquired by the data acquisition module to the server and receive a control instruction sent from the server. The control module is adapted to communicate with the server via the wireless transmission module and is adapted to control the street lamp based on the control instruction received by the wireless transmission module.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
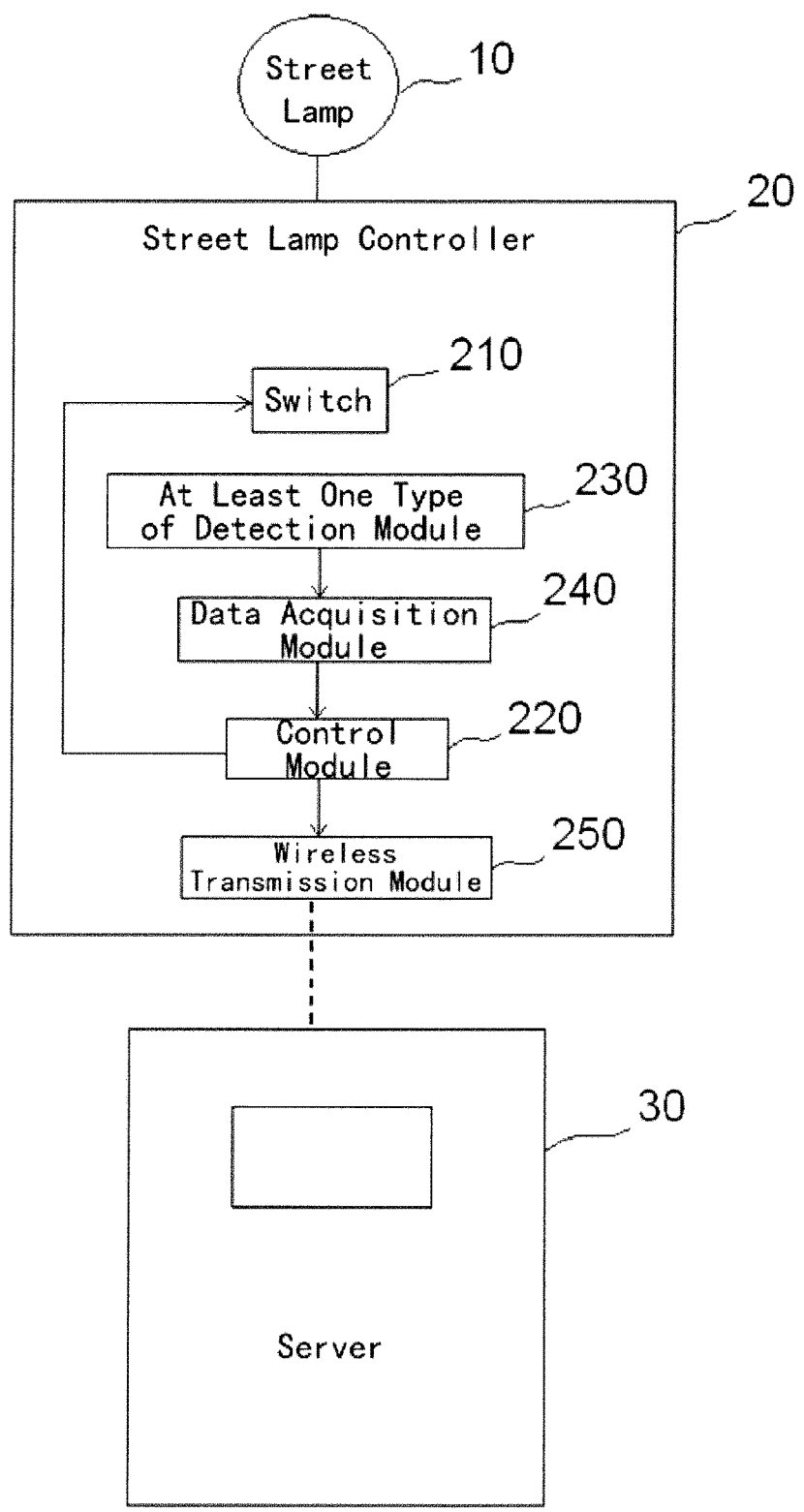
FIG. 1 is a block diagram of a street lamp controller according to an embodiment communicating with a street lamp and a backend server.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A street lamp controller 20 according to an embodiment is shown in FIG. 1. The street lamp controller 20 comprises a switch 210, a control module 220, at least one detection module 230, a data acquisition module 240, and a wireless transmission module 250.

The switch 210, shown in FIG. 1, is adapted to turn on or turn off a street lamp 10. In an embodiment, the switch 210 is a light-controlled switch.

The control module 220, shown in FIG. 1, is adapted to control the turning on and turning off of the switch 210. The control module 220 includes a central processing unit (CPU). The functions of each of the modules 230, 240, and 250 of the street lamp controller 20 described herein are performed by the CPU of the control module 220 and a memory of the street lamp controller 20. The memory is a non-transitory computer readable medium, including any kind of non-transitory digital memory such as random-access memory ("RAM") or read-only memory ("ROM"), or physical memory such as a CD-ROM. An algorithm corresponding to each of the modules 230, 240, and 250 is stored on the memory and the control module 220 executes the respective algorithms to perform the functions of the modules 230, 240, and 250 described herein. In an embodiment, each of the modules 230, 240, and 250 may include hardware in addition to the processor and the memory, such as a sensor, to serve the functions described herein.

Figure 2:
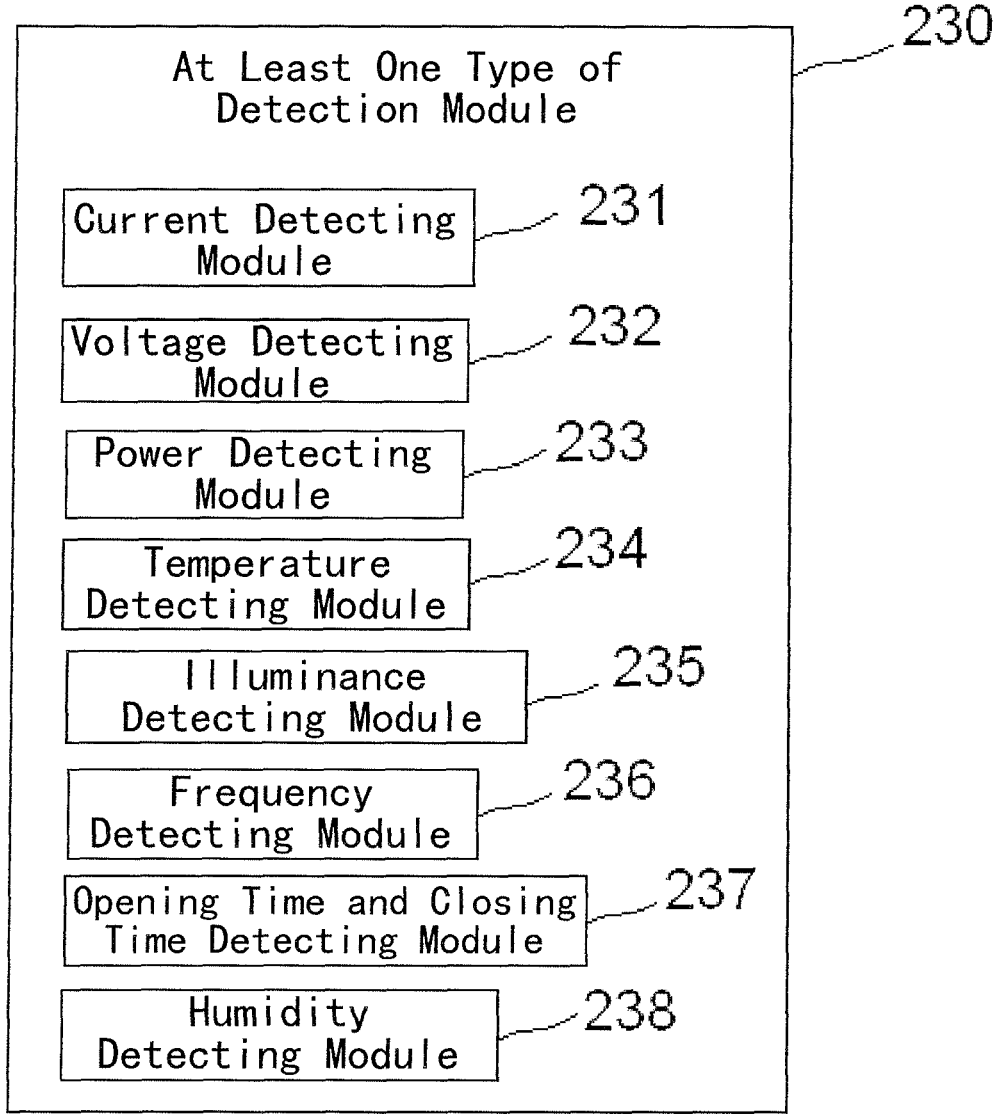
FIG. 2 is a block diagram of a plurality of detection modules of the street lamp controller of FIG. 1.

The at least one detection module 230, shown in FIGS. 1 and 2, is adapted to detect at least one data element relevant to operation of the street lamp 10. In an embodiment, the at least one data element relevant to the operation of the street lamp 10 may include a current, a voltage, a power, a current frequency, an illuminance, an opening time, a closing time, a temperature, and/or a humidity around the street lamp. In other embodiments, the at least one data element may include any other data element relevant to the operation of the street lamp 10. In an embodiment, the at least one detection module 230 uses a sensor to detect the at least one data element.

As shown in FIG. 1, the data acquisition module 240 is connected to the at least one detection module 230 and is adapted to acquire the at least one data element detected by the at least one detection module 230. The wireless transmission module 250 communicates with a backend server 30 and is adapted to transmit the at least one data element acquired by the data acquisition module 240 to the backend server 30 and receive a control instruction sent from the backend server 30. The control module 220 communicates with the server 30 via the wireless transmission module 250 and is adapted to control the street lamp 10 based on the control instruction received by the wireless transmission module 250. An operation state of the street lamp 10 may thus be adjusted in real time based on the detected data element.

The CPU of the control module 220 is adapted to analyze, transcode and communicate between the wireless transmission module 250 and the data acquisition module 240. Communication between the wireless transmission module 250 and a backend server 30 is achieved by software stored in a memory in the backend server 30 and executed by a processor of the backend server 30. The memory of the backend server 30 is a non-transitory computer readable medium, including any kind of non-transitory digital memory such as random-access memory ("RAM") or read-only memory ("ROM"), or physical memory such as a CD-ROM.

In an embodiment shown in FIG. 2, the at least one detection module 230 comprises a current detecting module 231 adapted to detect a current flowing through the street lamp 10, a voltage detecting module 232 adapted to detect a voltage of the street lamp 10, a power detecting module 233 adapted to detect a power of the street lamp 10, a temperature detecting module 234 adapted to detect an environmental temperature around the street lamp 10, an illuminance detecting module 235 adapted to detect an illuminance of the street lamp 10, a frequency detecting module 236 adapted to detect a frequency of the current passing through the street lamp 10, an opening time and closing time detecting module 237 adapted to detect the opening time and the closing time of the switch 210, and/or a humidity detecting module 238 adapted to detect an environmental humidity around the street lamp 10. In other embodiments, the at least one detection module 230 may include other detection modules adapted to detect any other data element relevant to the operation of the street lamp 10.

The at least one detection module 230 is adapted to detect the data element relevant to the operation of the street lamp 10 in real time and, consequently, a working state of the street lamp 10 may be adjusted by the street lamp controller 20 in real time based on the detected data element. For example, in one case, when a higher humidity is detected by the humidity detecting module 238, the backend server 30 may determine that it is a rainy day; the backend server 30 may send a control instruction for enhancing the illuminance of the street lamp 10. In another case, for example, when a lower temperature is detected by the temperature detecting module 234, such as below zero, the backend server 30 may determine that it is winter. Since it gets dark earlier and the daybreak is later, the backend server 30 may send instructions for turning on the switch 210 earlier and turning off the switch 210 later. In this way, the turning on time and turning off time of the street lamp 10 may be adjusted properly depending on changes in the seasons.

Figure 3:
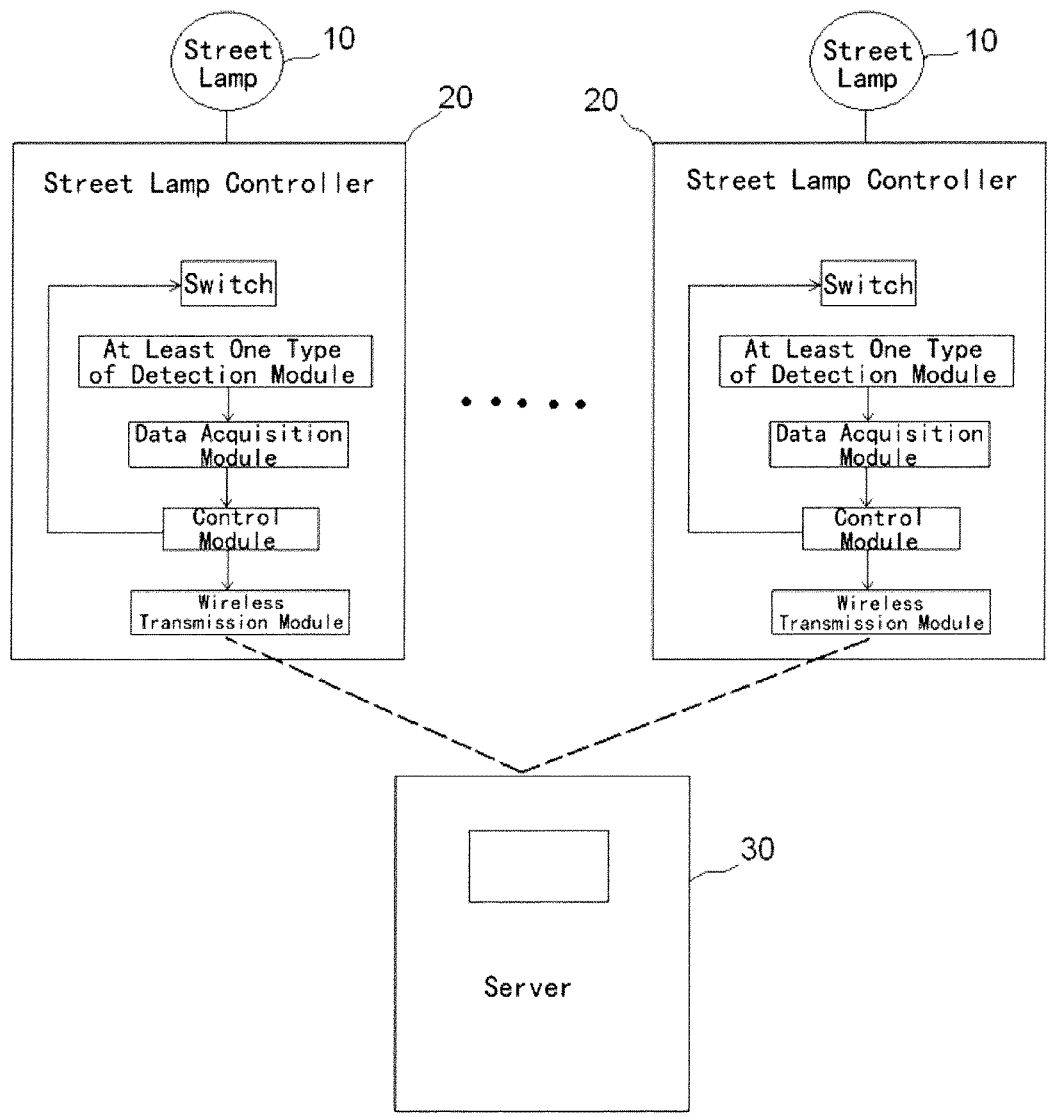
FIG. 3 is a block diagram of an intelligent control system for a plurality of street lamps including a plurality of street lamp controllers.

An intelligent control system for a plurality of street lamps 10 is shown in FIG. 3. The intelligent control system includes a plurality of street lamps 10, the above described street lamp controllers 20 mounted on the each of the street lamps 10, and a backend server 30. As shown in FIG. 3, the backend server 30 communicates with each of the street lamp controllers 20 via the wireless transmission module 250 on each of the street lamp controllers 20 as described above. The backend server 30 is adapted to receive the data element sent from each of the street lamp controllers 20, analyze the received data element, and send a corresponding control instruction to each of the street lamp controllers 20 based on analyzed results.

The backend server 30 changes the working state of each of the street lamps 10 in real time based on the acquired data element relevant to each of the street lamps 10. For example, in one case, when a lower humidity is detected by the humidity detecting module 238, the backend server 30 may determine that it is a dry and fine day. Then, the backend server 30 may send a control instruction for decreasing the illuminance of the street lamp 10. For example, in another case, when a higher temperature is detected by the temperature detecting module 234, such as above 30 degrees Celsius, the backend server 30 may determine that it is summer. Since it gets dark later and the daybreak is earlier, the backend server 30 may send instructions for turning on the switch 210 later and turning off the switch 210 earlier. In this way, the turning on time and turning off time of each of the street lamps 10 may be adjusted properly depending on changes in the seasons.

What is claimed is:

1. A street lamp controller, comprising:
   a switch configured to turn on and turn off a street lamp;
   a control module adapted to control the turning on and turning off of the switch;
   a detection module adapted to detect a data element relevant to operation of the street lamp, the detection module includes an opening time and closing time detecting module adapted to detect an opening time and a closing time of the switch;
   a data acquisition module connected to the detection module and adapted to acquire the data element detected by the detection module; and
   a wireless transmission module communicating with a server and adapted to transmit the data element acquired by the data acquisition module to the server and receive a control instruction sent from the server, the control module is adapted to communicate with the server via the wireless transmission module and is adapted to control the street lamp based on the control instruction received by the wireless transmission module.

2. The street lamp controller of claim 1, wherein the detection module includes at least one of:
   a current detecting module adapted to detect a current flowing through the street lamp;
   a voltage detecting module adapted to detect a voltage of the street lamp;
   a power detecting module adapted to detect a power of the street lamp;
   an illuminance detecting module adapted to detect an illuminance of the street lamp; and
   a humidity detecting module adapted to detect an environmental humidity around the street lamp.

3. The street lamp controller of claim 2, wherein the switch is a light-controlled switch.

4. The street lamp controller of claim 2, wherein the control module includes a central processing unit adapted to communicate with the server via the wireless transmission module.

5. The street lamp controller of claim 2, wherein the control module is adapted to control the illuminance of the street lamp based on the control instruction received by the wireless transmission module.

6. The street lamp controller of claim 1, wherein the detection module includes a temperature detecting module adapted to detect an environmental temperature around the street lamp.

7. The street lamp controller of claim 1, wherein the detection module includes a frequency detecting module adapted to detect a frequency of the current flowing through the street lamp.

8. An intelligent control system for a plurality of street lamps, comprising:
   a plurality of street lamp controllers, each of the street lamp controllers mounted on one of the plurality of street lamps and each including:

a switch configured to turn on and turn off the street lamp;

a control module adapted to control the turning on and turning off of the switch;

a detection module adapted to detect a data element relevant to operation of the street lamp, the detection module includes an opening time and closing time detecting module adapted to detect an opening time and a closing time of the switch;

a data acquisition module connected to the detection module and adapted to acquire the data element detected by the detection module; and a wireless transmission module adapted to transmit the data element acquired by the data acquisition module; and a backend server communicating with the wireless transmission module of each of the plurality of street lamp controllers, the backend server is adapted to receive the data element from each of the street lamp controllers, analyze the received data elements, and send a corresponding control instruction to each of the street lamp controllers based on the analysis, the control module of each of the street lamp controllers is adapted to control the street lamp based on the control instruction.

* * * * *